(12) United States Patent
Wang et al.

(10) Patent No.: US 11,190,360 B2
(45) Date of Patent: Nov. 30, 2021

(54) METHOD, APPARATUS, NODE, SIGNATURE DEVICE AND SYSTEM FOR GENERATING BLOCK OF BLOCKCHAIN

(71) Applicant: CloudMinds (Shanghai) Robotics Co., Ltd., Shanghai (CN)

(72) Inventors: Jian Wang, Shenzhen (CN); Hui Xie, Shenzhen (CN)

(73) Assignee: CloudMinds (Shanghai) Robotics Co., Ltd., Shanghai (CN)

(*) Notice: Subject to any disclaimer, the term of this patent is extended or adjusted under 35 U.S.C. 154(b) by 390 days.

(21) Appl. No.: 16/315,571

(22) PCT Filed: Dec. 23, 2016

(86) PCT No.: PCT/CN2016/111858
§ 371 (c)(1),
(2) Date: Jan. 4, 2019

(87) PCT Pub. No.: WO2018/112947
PCT Pub. Date: Jun. 28, 2018

(65) Prior Publication Data
US 2019/0238340 A1  Aug. 1, 2019

(51) Int. Cl.
*H04L 29/06* (2006.01)
*H04L 9/32* (2006.01)
(Continued)

(52) U.S. Cl.
CPC ........ *H04L 9/3247* (2013.01); *G06F 16/1824* (2019.01); *H04L 9/0643* (2013.01);
(Continued)

(58) Field of Classification Search
CPC ... H04L 9/3247; H04L 9/0643; H04L 9/0825; H04L 2209/38; G06F 16/1824
See application file for complete search history.

(56) References Cited

U.S. PATENT DOCUMENTS

| 10,007,913 B2 * | 6/2018 | Ebrahimi ........... G06Q 20/4014 |
| 2016/0125403 A1 | 5/2016 | Hu et al. |

(Continued)

FOREIGN PATENT DOCUMENTS

| CN | 105719172 A | 6/2016 |
| CN | 105761143 A | 7/2016 |

(Continued)

OTHER PUBLICATIONS

Yuita, Y., "Block Chain and Financial Transaction Innovation," Nomura Capital Market Quarterly, vol. 19, No. 2, Nov. 1, 2015, 49 pages.

(Continued)

*Primary Examiner* — Shawnchoy Rahman
(74) *Attorney, Agent, or Firm* — McCoy Russell LLP

(57) ABSTRACT

The present disclosure provides a method, apparatus, node, signature device and system for generating block of blockchain. The method for generating the blockchain block is applied to a first node in a blockchain network and includes: generating an original block according to a blockchain protocol; performing a digital signature operation on the original block to generate a signature block; and broadcasting the signature block in the blockchain network. By adoption of the method, a block generator of the block in the blockchain network may be confirmed via the digital signature thereof, and verifiable information is provided for the security of the blockchain network.

10 Claims, 5 Drawing Sheets

(51) Int. Cl.
*G06F 16/182* (2019.01)
*H04L 9/06* (2006.01)
*H04L 9/08* (2006.01)

(52) U.S. Cl.
CPC .......... *H04L 9/0825* (2013.01); *H04L 9/3239* (2013.01); *H04L 2209/38* (2013.01)

(56) References Cited

U.S. PATENT DOCUMENTS

| | | |
|---|---|---|
| 2016/0218879 A1 | 7/2016 | Ferrin |
| 2018/0130050 A1* | 5/2018 | Taylor ................... H04L 9/3247 |
| 2018/0183774 A1* | 6/2018 | Campagna ............ H04L 9/3247 |
| 2020/0184489 A1* | 6/2020 | Negi ..................... G06F 16/258 |
| 2020/0259666 A1* | 8/2020 | Jacobs .................. H04L 9/3255 |

FOREIGN PATENT DOCUMENTS

| | | |
|---|---|---|
| CN | 105959307 A | 9/2016 |
| CN | 105975868 A | 9/2016 |
| CN | 105976232 A | 9/2016 |
| CN | 106100981 A | 11/2016 |
| CN | 106130738 A | 11/2016 |
| JP | 2009246657 A | 10/2009 |
| JP | 2016170530 A | 9/2016 |

OTHER PUBLICATIONS

"Blockchain technology to achieve transparency and fairness", Information Processing Society of Japan, vol. 57, No. 9, Aug. 15, 2016, 12 pages.

Min, X. et al., "A Permissioned Blockchain Framework for Supporting Instant Transaction and Dynamic Block Size," Proceedings of the 2016 IEEE Trustcom/BigDataSE/ISPA, Aug. 23, 2016, Tianjin, China, 7 pages.

Japanese Patent Office, Office Action Issued in Application No. 2018-563721, dated May 21, 2019, 14 pages. (Submitted with Machine Translation).

European Patent Office, Extended European Search Report Issued in Application No. 16924817.6, dated Jun. 25, 2019, Germany, 9 pages.

Japanese Patent Office, Office Action Issued in Application No. 2018-563721, dated Sep. 24, 2019, 13 pages. (Submitted with Machine Translation).

ISA State Intellectual Property Office of the People's Republic of China, International Search Report Issued in Application No. PCT/CN2016/111858, Sep. 28, 2017, WIPO, 5 pages.

* cited by examiner

METHOD, APPARATUS, NODE, SIGNATURE DEVICE AND SYSTEM FOR GENERATING BLOCK OF BLOCKCHAIN

CROSS-REFERENCE TO RELATED APPLICATIONS

The present application is a U.S. National Phase of International Patent Application Serial No. PCT/CN2016/111858 entitled "BLOCK OF BLOCKCHAIN GENERATION METHOD, DEVICE, NODE, AND SIGNATURE DEVICE AND SYSTEM," filed on Dec. 23, 2016. The entire contents of the above-cited application are hereby incorporated by reference in their entirety for all purposes.

FIELD OF THE INVENTION

The present disclosure relates to the field of blockchains, and in particular to a method, apparatus, node, signature device and system for generating block of blockchain.

BACKGROUND OF THE INVENTION

The blockchain technology is a distributed, non-centralized and untrusted network data consensus storage technology. It is implemented based on a unique block generation mechanism, such as PoW (Proof of Work), PoS (Proof of Stake), and P2P (Peer to Peer) network communication mechanisms.

Generally speaking, in a blockchain forming process, each node participating in the calculation has the same authority, including transfer, calculation of blocks (commonly known as mining), and the like. In the block generation mechanism, the generation of an effective block is based on the work of correctly solving a mathematical problem requiring a calculated amount, any node can generate the block and can be accepted by other nodes, and the information in the block has nothing to do with a block generator. However, this block generation mechanism brings certain hidden dangers to the security of the blockchain network.

SUMMARY OF THE INVENTION

The present disclosure provides a method, apparatus, node, signature device and system for generating block of blockchain, for achieving the purpose of improving the security of a blockchain network.

According to a first aspect of the embodiments of the present disclosure, a method for generating a blockchain block is provided, applied to a first node in a blockchain network, and the method includes: generating an original block according to a blockchain protocol; performing a digital signature operation on the original block to generate a signature block; and broadcasting the signature block in the blockchain network.

According to a second aspect of the embodiments of the present disclosure, an apparatus for generating a blockchain block is provided, configured in a first node in a blockchain network, and the apparatus includes: an original block generation module, configured to generate an original block according to a blockchain protocol; a signature module, configured to perform a digital signature operation on the original block to generate a signature block; and a broadcasting module, configured to broadcast the signature block in the blockchain network.

According to a third aspect of the embodiments of the present disclosure, a method for generating a blockchain block is provided, applied to a signature device, and the method includes: receiving an intermediate signature sent by a first node in a blockchain network, wherein the intermediate signature is generated by the first node by performing a digital signature operation on a hash value of an original block generated by the first node by using a private key of the first node; verifying the intermediate signature; performing the digital signature operation on the hash value of the original block contained in the intermediate signature by using the private key of the signature device to generate an original block signature, in the case that the intermediate signature passes the verification; and sending the original block signature to the first node, wherein the original block signature is used for causing the first node to attach the original block signature to the original block to generate a signature block.

According to a fourth aspect of the embodiments of the present disclosure, an apparatus for generating a blockchain block is provided, configured in a signature device, and the apparatus includes: an intermediate signature receiving module, configured to receive an intermediate signature sent by a first node in a blockchain network, wherein the intermediate signature is generated by the first node by performing a digital signature operation on a hash value of an original block generated by the first node by using a private key of the first node; an intermediate signature verification module, configured to verify the intermediate signature received by the intermediate signature receiving module; an original signature generation module, configured to perform the digital signature operation on the hash value of the original block contained in the intermediate signature by using the private key of the signature device to generate an original block signature, in the case that the intermediate signature passes the verification of the intermediate signature verification module; and an original signature sending module, configured to send the original block signature generated by the original signature generation module to the first node, wherein the original block signature is used for causing the first node to attach the original block signature to the original block to generate a signature block.

According to a fifth aspect of the embodiments of the present disclosure, a method for generating a blockchain block is provided, applied to a second node in a blockchain network, and the method includes: receiving a signature block broadcasted by a first node in the blockchain network, wherein the signature block is generated by the first node by performing a digital signature operation on an original block, and the original block is generated by the first node according to a blockchain protocol; verifying the signature of the signature block; and adding the signature block to the blockchain network in the case that the signature of the signature block passes the verification.

According to a sixth aspect of the embodiments of the present disclosure, an apparatus for generating a blockchain block is provided, configured in a second node in a blockchain network, and the apparatus includes: a signature block receiving module, configured to receive a signature block broadcasted by a first node in the blockchain network, wherein the signature block is generated by the first node by performing a digital signature operation on an original block, and the original block is generated by the first node according to a blockchain protocol; a signature block verification module, configured to verify the signature of the signature block received by the signature block receiving module; and a signature block adding module, configured to add the signature block to the blockchain network in the case that the signature of the signature block passes the verification of the signature block verification module.

According to a seventh aspect of the embodiments of the present disclosure, a non-transitory computer readable storage medium is provided. The non-transitory computer readable storage medium includes one or more programs, and the one or more programs are used for executing the method of any embodiment in the first aspect of the embodiments of the present disclosure.

According to an eighth aspect of the embodiments of the present disclosure, a blockchain network node is provided. The blockchain network node includes: the non-transitory computer readable storage medium in the seventh aspect of the embodiments of the present disclosure; and one or more processors used for executing the programs in the non-transitory computer readable storage medium.

According to a ninth aspect of the embodiments of the present disclosure, a non-transitory computer readable storage medium is provided. The non-transitory computer readable storage medium includes one or more programs, and the one or more programs are used for executing the method for generating the blockchain block in any embodiment of the third aspect of the present disclosure.

According to a tenth aspect of the embodiments of the present disclosure, a signature device is provided. The signature device includes: the non-transitory computer readable storage medium in the eighth aspect of the embodiments of the present disclosure; and one or more processors used for executing the programs in the non-transitory computer readable storage medium.

According to an eleventh aspect of the embodiments of the present disclosure, a non-transitory computer readable storage medium is provided. The non-transitory computer readable storage medium includes one or more programs, and the one or more programs are used for executing the method for generating the blockchain block in any embodiment of the fifth aspect of the present disclosure.

According to a twelfth aspect of the embodiments of the present disclosure, a blockchain network node is provided. The blockchain network node includes: the non-transitory computer readable storage medium in the eleventh aspect of the embodiments of the present disclosure; and one or more processors used for performing the programs in the non-transitory computer readable storage medium.

According to a thirteenth aspect of the embodiments of the present disclosure, a system for generating a blockchain block is provided. The system may include: at least one blockchain network node in the eighth aspect of the embodiments of the present disclosure, at least one signature device in the tenth aspect of the embodiments of the present disclosure, and at least one blockchain network node in the twelfth aspect of the embodiments of the present disclosure, wherein the blockchain network node in the eighth aspect of the embodiments of the present disclosure and the blockchain network node in the twelfth aspect of the embodiments of the present disclosure belong to the same blockchain network.

By means of one aspect of the above technical solutions, the first node in the blockchain network generates the original block according to the blockchain protocol, performs the digital signature operation on the original block, generates the signature block, and broadcasts the signature block in the blockchain network, so that a block generator of the block in the blockchain network may be confirmed via the digital signature thereof, and verifiable information is provided for the security of the blockchain network.

By means of another aspect of the above technical solutions, the signature device according to the embodiments of the present disclosure receives the intermediate signature sent by the first node in the blockchain network, verifies the intermediate signature, performs the digital signature operation on the intermediate signature by using the private key of the signature device to generate the original block signature in the case that the intermediate signature passes the verification, and causes the first node to attach the original block signature to the original block generated by the first node to generate the signature block, so that the block generator of the block in the blockchain network may be confirmed via the digital signature thereof, and verifiable information is provided for the security of the blockchain network.

By means of yet another aspect of the above technical solutions, the second node in the blockchain network receives the signature block broadcasted by a first node in the blockchain network, and adds the signature block to the blockchain network in the case that the signature of the signature block passes the verification, so that the generator of the block can be controlled, and only the block published by the verified block generator can be accepted by other nodes, thus providing certain guarantee for the security of the blockchain network.

Other features and advantages of the present disclosure will be described in detail in the following detailed description.

BRIEF DESCRIPTION OF THE DRAWINGS

The drawings used for providing a further understanding of the present disclosure, constitute a part of the description and are used for explaining the present disclosure together with the following detailed description, but do not constitute limitations to the present disclosure. In the drawings.

DETAILED DESCRIPTION OF THE EMBODIMENTS

The specific embodiments of the present disclosure will be described in detail below with reference to the drawings. It should be understood that the specific embodiments described herein are merely used for illustrating and explaining the present disclosure rather than limiting the present disclosure.

Figure 1:
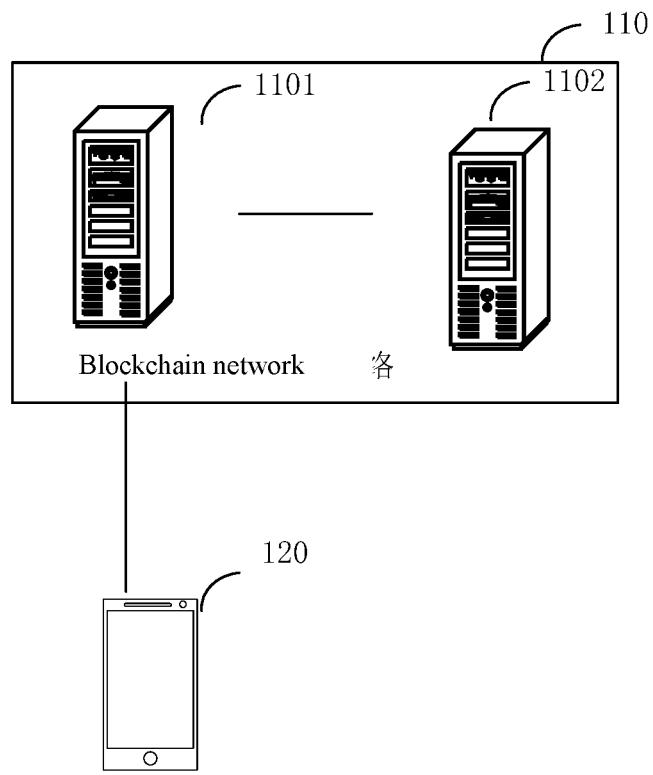
FIG. 1 is a schematic diagram of an implementation environment shown according to an exemplary embodiment of the present disclosure.

FIG. 1 is a schematic diagram of an implementation environment shown according to an exemplary embodiment of the present disclosure. As shown in FIG. 1, the implementation environment may include a blockchain network 110 composed of a plurality of nodes, and a signature device 120. Wherein, a cloud host 1101 and a cloud host 1102 are respectively two nodes in the blockchain network 110. The signature device 120 may be a mobile terminal such as a smart phone or a tablet computer or the like.

It may be understood that the implementation environment as shown in FIG. 1 is only used for illustrating the method provided by the embodiments of the present invention, and does not constitute limitations to the embodiments of the present disclosure. For example, the blockchain network 110 may include two or more nodes, the nodes may be the cloud hosts and may also be other devices having corresponding computing capabilities, and this is not limited in the present disclosure. One or more signature devices 120 may be provided. The node and the signature device may communicate through a P2P network, and may also communicate through networks of other structures, and this is not limited in the present disclosure.

In order to make the embodiments of the present disclosure be easier to be understood, the blockchain network is briefly introduced. The blockchain network as shown in FIG. 1 is a P2P-based peer-to-peer network composed of a plurality of nodes. Each node in the blockchain network maintains a string of blockchain generated by being correlated using a cryptographic method. The nodes obtain the latest blocks by broadcasting, thereby ensuring that the blocks between the nodes are maintained synchronously. Therefore, the cloud host 1101 and the cloud host 1102 as shown in FIG. 1 synchronously maintain their respective blockchains.

Figure 2:
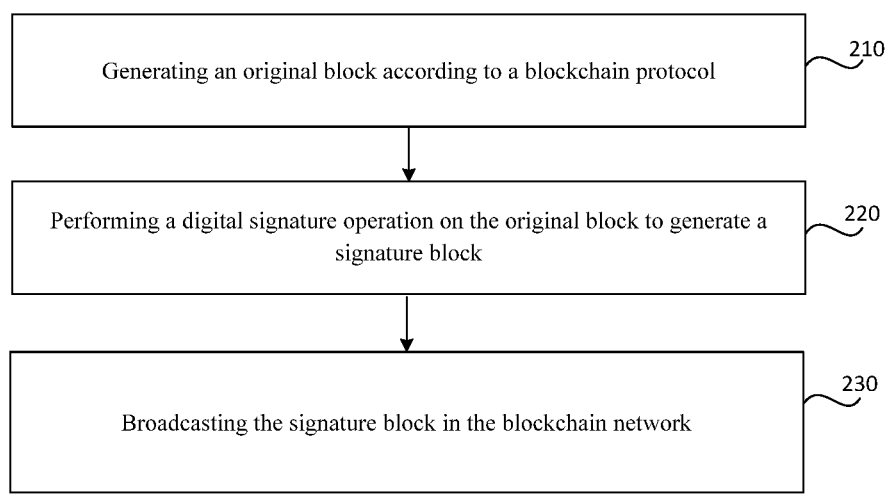
FIG. 2 is a flowchart of a method for generating a blockchain block shown according to an exemplary embodiment of a first aspect of the present disclosure.

FIG. 2 is a flowchart of a method for generating a blockchain block shown according to an exemplary embodiment of a first aspect of the present disclosure. The method may be applied to a first node in the blockchain network. It may be understood that the first node may be any node in the blockchain network. For example, the first node may be the cloud host 1101 as shown in FIG. 1. The method includes:

In step 210, an original block is generated according to a blockchain protocol.

For example, the first node may receive the broadcast of the entire network Transaction (transaction) and process the received transaction according to the blockchain protocol to generate the original block. Correspondingly, the original block contains data specified by the transaction and the protocol.

In step 220, a digital signature operation is performed on the original block to generate a signature block.

In a possible embodiment, in the step 220, the digital signature operation may be performed on a hash value of the original block by using a private key of the first node to generate an original block signature, and the original block signature is attached to the original block to generate the signature block.

In another possible embodiment, in the step 220, the digital signature operation may be performed on the hash value of the original block by using the private key of the first node to generate an intermediate signature, the intermediate signature is sent to a signature device, and an original block signature sent by the signature device is received. Wherein, the original block signature may be generated by the signature device by performing the digital signature operation on the hash value of the original block contained in the intermediate signature by using the private key of the signature device, in the case that the intermediate signature passes the verification. The original block signature is attached to the original block to generate the signature block.

With respect to the original block, for example, the hash value may be calculated by using an algorithm such as SHA-256. The data size of the hash value calculated by the algorithm is very small and is just 32 bytes. As another example, the digital signature operation may be performed by using an ECDSA signature algorithm. The signature of the ECDSA signature algorithm is only 64 bytes in the case of a 256-bit key length.

It should be noted that the embodiment of verifying the intermediate signature by the signature device is not limited in the present disclosure.

For example, public keys of all legal nodes may be pre-stored in the signature device, so that the signature device verifies the intermediate signature by using the public keys of the legal nodes.

As another example, the signature device may pre-store the public key of the legal node having a corresponding relationship with the same. It may be understood that, in the embodiment, different nodes are allowed to correspond to different signature devices. Therefore, the first node may send the intermediate signature to the signature device having the corresponding relationship with the first node, and the signature device verifies the intermediate signature by using the public key of the legal node having the corresponding relationship, and further performs the digital signature operation by using the private key of the signature device to generate the original block signature in the case that the intermediate signature is the signature of the first node having the corresponding relationship. By adoption of the embodiment, different signature devices may respectively sign the corresponding legal nodes, thereby implementing respective control of different types of block generators, and further ensuring the security of the blockchain network.

The corresponding relationship between the first node and the signature device may be set in the blockchain. For example, in the implementation environment as shown in FIG. 1, the corresponding relationship between the node and the signature device is stored in the blockchain maintained by each node of the blockchain network 110. For example, the cloud host 1101 has the corresponding relationship with the signature device 120, and then the cloud host 1101 may query the corresponding relationship between the cloud host 1101 and the signature device 120 in the blockchain maintained by the cloud host 1101.

It needs to be noted that the corresponding relationship between the node and the signature device may be a one-to-many, many-to-one, or many-to-many relationship, which is not limited in the present disclosure.

For example, when the corresponding relationship between the node and the signature device is the one-to-many relationship, since a plurality of signature devices may sign the same node, in the case that a certain signature device cannot perform the signature due to a network connection problem or other own problems, there is still considerable system redundancy. Even if the signature device is partially attacked or destroyed, no influence is generated to the blockchain. Therefore, the embodiment is applicable to a scenario in which multiple people have signature authority, such as an enterprise control node, and the signature device is controlled by a designated employee.

As another example, when the corresponding relationship between the node and the signature device is the many-to-one relationship, the blocks generated by a plurality of nodes can be signed by the signature device, so that higher redundancy is available for the offline or other errors of the nodes. In the case that a part of nodes are attacked or destroyed, the success rate of the block generation can still be guaranteed.

As yet another example, when the corresponding relationship between the node and the signature device is the many-to-many relationship, for example, there may be a plurality of node groups, a plurality of signature device groups, each node group includes a plurality of nodes, each signature device group includes a plurality of signature devices, and one node group may correspond to one signature device group, then, the block generated by any node in the node group may be signed by any signature device in the corresponding signature device group. In the embodiment, the advantages of the above two methods are integrated, and the nodes and the signature devices have good system redundancy. For example, different signature groups can represent different organizations.

In step 230, the signature block is broadcasted in the blockchain network.

For example, a second node that receives the broadcast in the blockchain network may add the signature block to the blockchain network in the case that the signature of the signature block passes the verification.

In this way, by adoption of the technical solution provided by the above embodiment of the present disclosure, the first node in the blockchain network may generate the original block according to the blockchain protocol, perform the digital signature operation on the original block to generate the signature block, and broadcast the signature block in the blockchain network, so that the block generator of the block in the blockchain network may be confirmed via the digital signature thereof, and verifiable information is provided for the security of the blockchain network.

Especially in some application environments, the generator of the block needs to be controlled, for example, only a specific node is allowed to generate a new block. According to the method provided by the embodiment of the present disclosure, the block generator may prove itself as a legal block generator by performing the digital signature operation on the block, so that only the block published by the legal block generator may be accepted and approved by other nodes.

Figure 3:
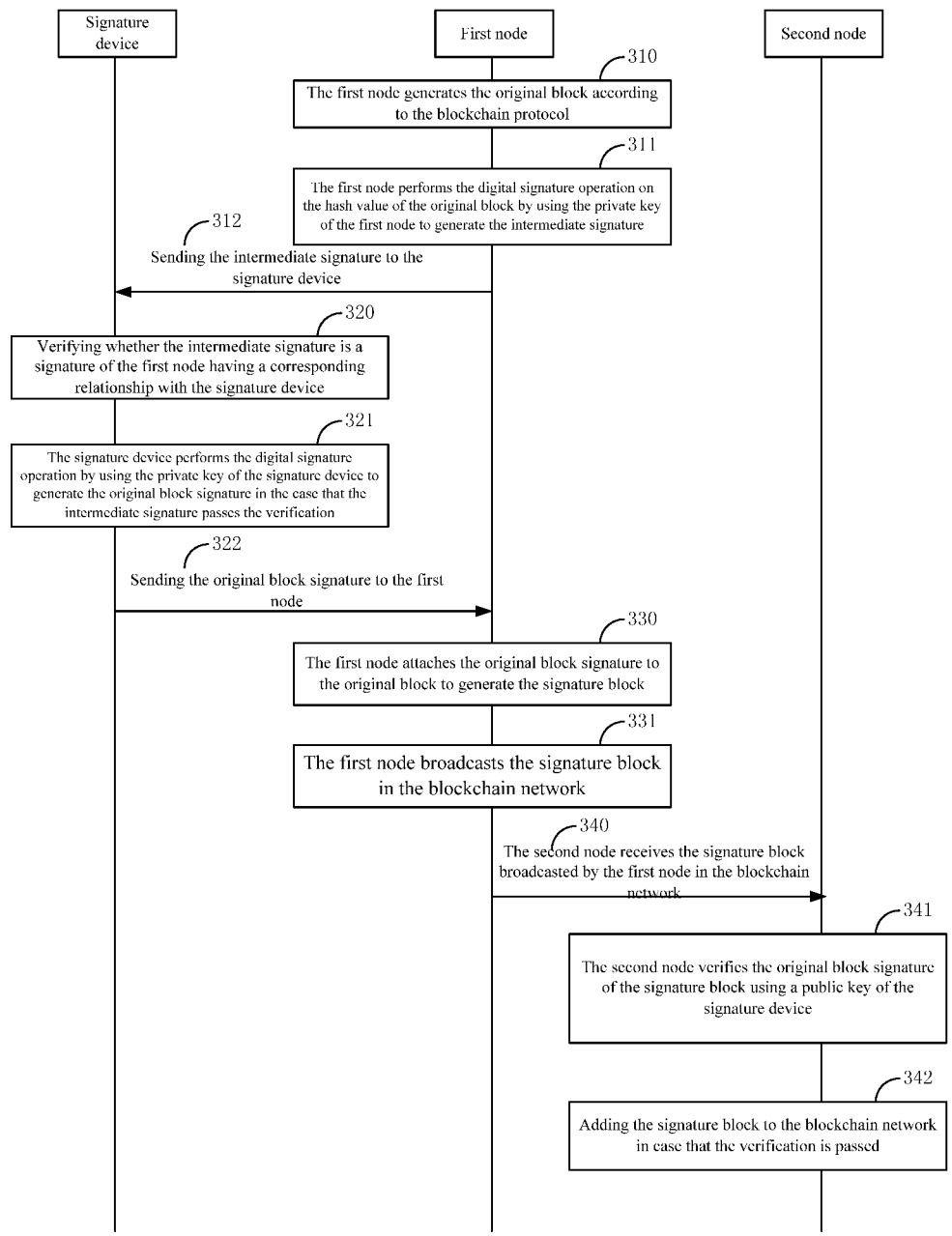
FIG. 3 is a schematic diagram of signaling interaction of a method for generating a blockchain block shown according to an exemplary embodiment of the present disclosure.

In order to make the technical solutions provided by the embodiment of the present disclosure easier to be understood, a detailed description is given below in combination with a possible signaling interaction mode of the embodiment of the present disclosure. FIG. 3 is a schematic diagram of signaling interaction of a method for generating a blockchain block shown according to an exemplary embodiment of the present disclosure. As shown in FIG. 3, the method includes:

In step 310, the first node generates the original block according to the blockchain protocol.

In step 311, the first node performs the digital signature operation on the hash value of the original block by using the private key of the first node to generate the intermediate signature.

In step 312, the first node sends the intermediate signature to the signature device.

In step 320, the signature device verifies whether the intermediate signature is a signature of the first node having a corresponding relationship with the signature device. In the case that the verification device determines that the intermediate signature is the signature of the first node having the corresponding relationship with the signature device, the verification is passed.

In step 321, the signature device performs the digital signature operation on the hash value of the original block contained in the intermediate signature by using the private key of the signature device to generate the original block signature in the case that the intermediate signature passes the verification.

In step 322, the signature device sends the original block signature to the first node.

In step 330, the first node attaches the original block signature to the original block to generate the signature block.

In step 331, the first node broadcasts the signature block in the blockchain network.

In step 340, the second node receives the signature block broadcasted by the first node in the blockchain network.

In step 341, the second node verifies the original block signature of the signature block using a public key of the signature device.

In step 342, the signature block is added to the blockchain network in case that the verification is passed.

Therefore, in the embodiment, since the node and the signature device respectively assume the roles of generating the block and signing, the signature device does not need to receive the transaction, does not need to participate in the generation of the original block, and does not need to synchronize the entire blockchain; the signature device does not involve in huge calculations such as PoW and the like and has a small transmitted signature data size, thereby reducing the requirements for the network stability and the device computing capability; it is suitable for signing the block by using the signature device such as a mobile terminal, and the application range is wider.

Figure 4:
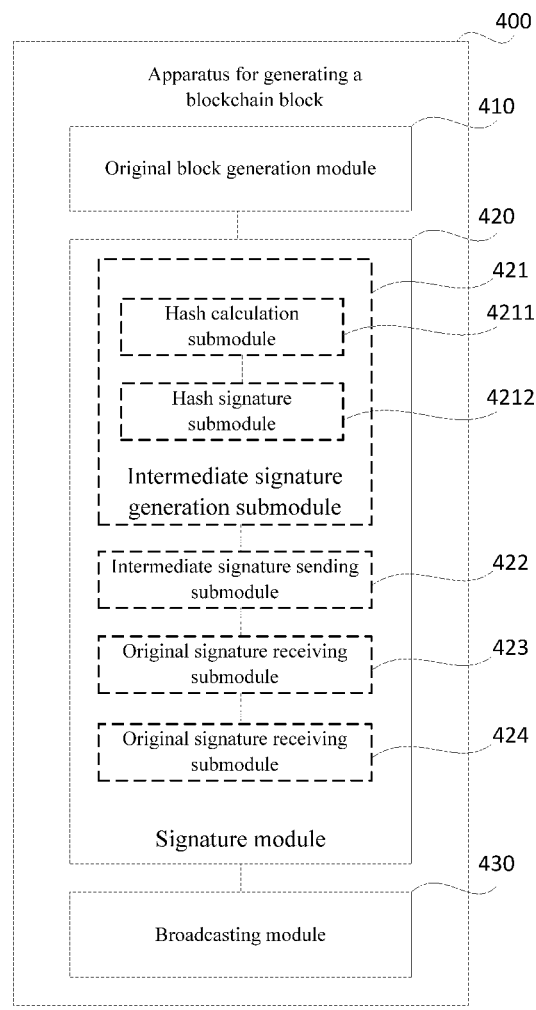
FIG. 4 is a block diagram of an apparatus for generating a blockchain block shown according to an exemplary embodiment of a second aspect of the present disclosure.

FIG. 4 is a block diagram of an apparatus 400 for generating a blockchain block shown according to an exemplary embodiment of a second aspect of the present disclosure. The apparatus may be configured in a first node in a blockchain network. For example, the first node may be the cloud host 1101 as shown in FIG. 1. The apparatus includes: an original block generation module 410, a signature module 420 and a broadcasting module 430.

The original block generation module 410 may be configured to generate an original block according to a blockchain protocol.

The signature module 420 may be configured to perform a digital signature operation on the original block generated by the original block generation module 410 to generate a signature block.

In a possible embodiment, the signature module 420 may be configured to perform the digital signature operation on a hash value of the original block by using a private key of the first node to generate an original block signature, and attach the original block signature to the original block to generate the signature block.

In another possible embodiment, the signature module 420 may include: an intermediate signature generation submodule 421, an intermediate signature sending submodule 422, an original signature receiving submodule 423 and a signature block generation submodule 424.

The intermediate signature generation submodule 421 may be configured to perform the digital signature operation on the hash value of the original block by using the private key of the first node to generate an intermediate signature. Optionally, the intermediate signature generation submodule 421 may include: a hash calculation submodule 4211, which may be configured to calculate the hash value of the original block; and a hash signature submodule 4212, which may be configured to perform the digital signature operation on the hash value by using the private key of the first node to generate the intermediate signature.

The intermediate signature sending submodule 422 may be configured to send the intermediate signature to the signature device.

The original signature receiving submodule 423 may be configured to receive the original block signature sent by the signature device, wherein the original block signature is generated by the signature device by performing the digital signature operation on the hash value of the original block contained in the intermediate signature by using the private key of the signature device in the case that the intermediate signature passes the verification.

The signature block generation submodule 424 may be configured to attach the original block signature to the original block to generate the signature block.

It needs to be noted that the embodiment of verifying the intermediate signature by the signature device is not limited in the present disclosure. Optionally, the intermediate signature sending submodule 422 may be configured to send the intermediate signature to the signature device having a corresponding relationship with the first node. Therefore, the signature device verifies the intermediate signature by using the public key of the legal node having the corresponding relationship, and performs the digital signature operation on the hash value of the original block contained in the intermediate signature by using the private key of the signature device in the case that the intermediate signature is determined as the signature of the first node having the corresponding relationship. Therefore, the original block signature is generated by the signature device by performing the digital signature operation on the hash value of the original block contained in the intermediate signature by using the private key of the signature device in the case that the intermediate signature is determined as the signature of the first node having the corresponding relationship. By adoption of the embodiment, different signature devices may respectively sign the legal nodes corresponding thereto, thereby implementing respective control of different types of block generators, and further ensuring the security of the blockchain network.

In the above embodiment, since the node and the signature device respectively assume the roles of generating the block and signing, the signature device does not need to receive the transaction, does not need to participate in the generation of the original block, and does not need to synchronize the entire blockchain; the signature device does not involve in huge calculations such as PoW and the like and has a small transmitted signature data size, thereby reducing the requirements for the network stability and the device computing capability; it is suitable for signing the block by using the signature device such as a mobile terminal, and the application range is wider.

The broadcasting module 430 may be configured to broadcast the signature block generated by the signature module 420 in the blockchain network.

Optionally, the signature block may be used for causing the second node that receives the broadcast in the blockchain network to add the signature block to the blockchain network in the case that the signature of the signature block passes the verification.

In this way, by adoption of the technical solution provided by the above embodiment of the present disclosure, the first node in the blockchain network may generate the original block according to the blockchain protocol, perform the digital signature operation on the original block to generate the signature block, and broadcast the signature block in the blockchain network, so that the block generator of the block in the blockchain network may be confirmed via the digital signature thereof, and verifiable information is provided for the security of the blockchain network.

It needs to be noted that the intermediate signature generation submodule 421, the intermediate signature sending submodule 422, the original signature receiving submodule 423, the signature block generation submodule 424, the hash calculation submodule 4211 and the hash signature submodule 4212 are drawn in FIG. 4 in dashed lines to indicate that these submodules are not necessary modules of the apparatus for generating the blockchain block provided by the embodiment of the present disclosure.

Figure 5:
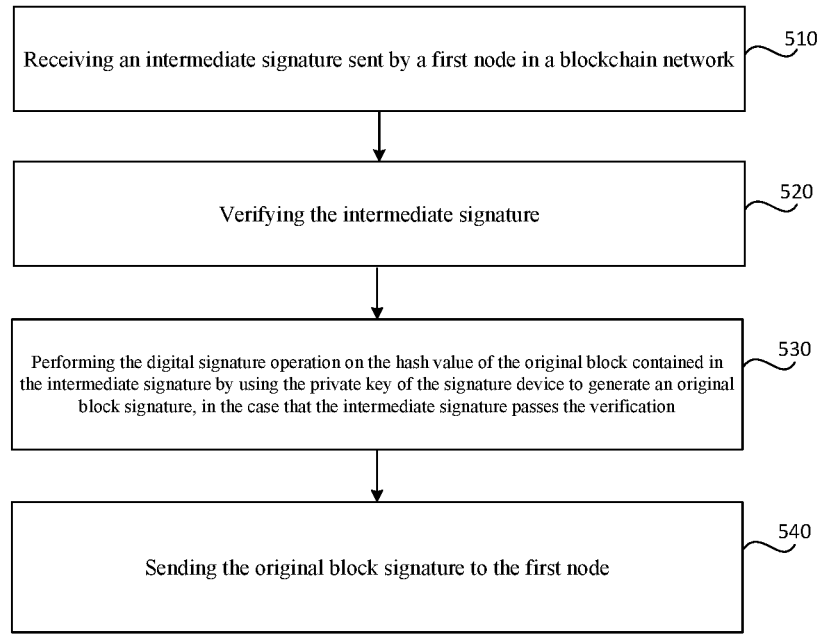
FIG. 5 is a flowchart of a method for generating a blockchain block shown according to an exemplary embodiment of a third aspect of the present disclosure.

FIG. 5 is a flowchart of a method for generating a blockchain block shown according to an exemplary embodiment of a third aspect of the present disclosure. The method may be applied to a signature device. For example, the signature device may be a mobile terminal 120 as shown in FIG. 1. The method includes:

In step 510, an intermediate signature sent by a first node in a blockchain network is received, wherein the intermediate signature is generated by the first node by performing a digital signature operation on a hash value of an original block generated by the first node by using a private key of the first node.

In step 520, the intermediate signature is verified.

In a possible embodiment, public keys of all legal nodes may be pre-stored in the signature device, so that the signature device verifies the intermediate signature by using the public key of the legal node.

In another possible embodiment, the signature device may pre-store the public key of the legal node having a corresponding relationship with the same. It may be understood that, in the embodiment, different nodes are allowed to correspond to different signature devices. Therefore, in step 420, the signature device may verify whether the intermediate signature is a signature of the first node having a corresponding relationship with the signature device, and in the case that the intermediate signature is the signature of the first node having the corresponding relationship with the signature device, the verification is passed.

By means of the above embodiment, different signature devices may respectively sign the corresponding legal nodes, thereby implementing respective control of different types of block generators, and further ensuring the security of the blockchain network.

In step 530, in the case that the intermediate signature passes the verification, a digital signature operation is performed on a hash value of the original block contained in the intermediate signature by using the private key of the signature device to generate an original block signature.

In step 540, the original block signature is sent to the first node, wherein the original block signature is used for causing the first node to attach the original block signature to the original block generated by the first node to generate a signature block.

Therefore, by adoption of the technical solution provided by the above embodiment of the present disclosure, the signature device may receive the intermediate signature sent by the first node in the blockchain network, verify the intermediate signature, perform the digital signature operation on the hash value of the original block contained in the intermediate signature by using the private key of the signature device to generate the original block signature in the case that the intermediate signature passes the verification, and cause the first node to attach the original block signature to the original block generated by the first node to generate the signature block, so that the block generator of the block in the blockchain network may be confirmed via the digital signature thereof, and verifiable information is provided for the security of the blockchain network. Moreover, since the node and the signature device respectively assume the roles of generating the block and signing, the signature device does not need to receive the transaction, does not need to participate in the generation of the original block, and does not need to synchronize the entire blockchain; the signature device does not involve in huge calculations such as PoW and the like and has a small transmitted signature data size, thereby reducing the requirements for the network stability and the device computing capability; it is suitable for signing the block by using the signature device such as a mobile terminal, and the application range is wider.

Figure 6:
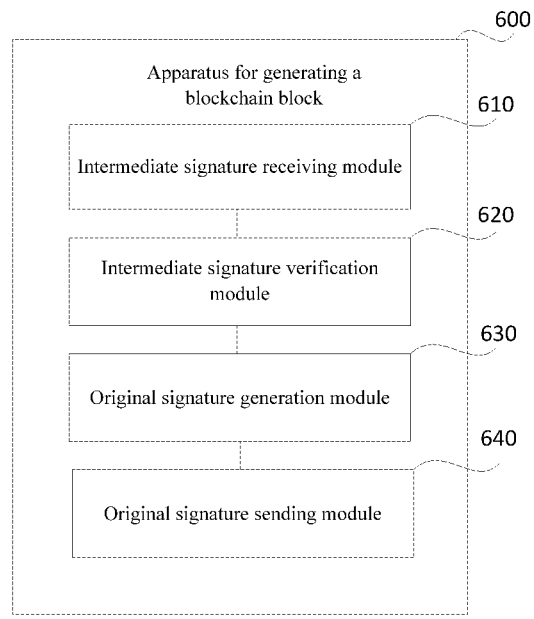
FIG. 6 is a block diagram of an apparatus for generating a blockchain block shown according to an exemplary embodiment of a fourth aspect of the present disclosure.

FIG. 6 is a block diagram of an apparatus 600 for generating a blockchain block shown according to an exemplary embodiment of a fourth aspect of the present disclosure. The apparatus may be configured in a signature device. For example, the signature device may be a mobile terminal 120 as shown in FIG. 1. The apparatus includes: an intermediate signature receiving module 610, an intermediate signature verification module 620, an original signature generation module 630 and an original signature sending module 640.

The intermediate signature receiving module 610 may be configured to receive an intermediate signature sent by a first node in a blockchain network, wherein the intermediate signature is generated by the first node by performing a digital signature operation on a hash value of an original block generated by the first node by using a private key of the first node.

The intermediate signature verification module 620 may be configured to verify the intermediate signature received by the intermediate signature receiving module 610.

In a possible embodiment, public keys of all legal nodes may be pre-stored in the signature device, so that the signature device verifies the intermediate signature by using the public key of the legal node.

In another possible embodiment, the signature device may pre-store the public key of the legal node having corresponding relationship with the same. It may be understood that, in the embodiment, different nodes are allowed to correspond to different signature devices. Therefore, the intermediate signature verification module 620 may be configured to verify whether the intermediate signature is a signature of the first node having a corresponding relationship with the signature device, and in the case that the intermediate signature is the signature of the first node having the corresponding relationship with the signature device, the verification is passed.

By means of the above embodiment, different signature devices may respectively sign the legal nodes corresponding thereto, thereby implementing respective control of different types of block generators, and further ensuring the security of the blockchain network.

The original signature generation module 630 is configured to perform the digital signature operation on the hash value of the original block contained in the intermediate signature by using the private key of the signature device to generate an original block signature, in the case that the intermediate signature passes the verification of the intermediate signature verification module 620.

The original signature sending module 640 may be configured to send the original block signature generated by the original signature generation module 630 to the first node, wherein the original block signature is used for causing the first node to attach the original block signature to the original block generated by the first node to generate a signature block.

Therefore, by adoption of the technical solution provided by the above embodiment of the present disclosure, the signature device may receive the intermediate signature sent by the first node in the blockchain network, verify the intermediate signature, perform the digital signature operation on the hash value of the original block contained in the intermediate signature by using the private key of the signature device to generate the original block signature in the case that the intermediate signature passes the verification, and cause the first node to attach the original block signature to the original block generated by the first node to generate the signature block, so that the block generator of the block in the blockchain network may be confirmed via the digital signature thereof, and verifiable information is provided for the security of the blockchain network. Moreover, since the node and the signature device respectively assume the roles of generating the block and signing, the signature device does not need to receive the transaction, does not need to participate in the generation of the original block, and does not need to synchronize the entire blockchain; the signature device does not involve huge calculations such as PoW and the like and the amount of signature data transmitted thereby is small, thereby reducing the requirements for the network stability and the device computing capability; it is suitable for signing the block by using the signature device such as a mobile terminal, and the application range is wider.

Figure 7:
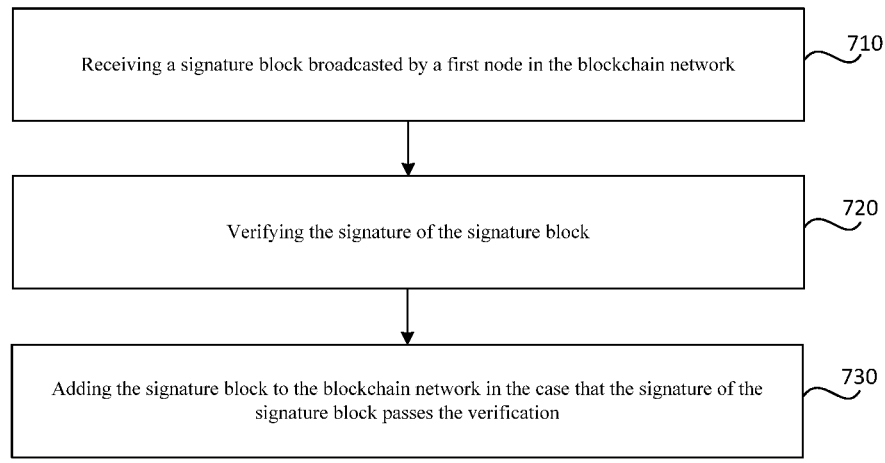
FIG. 7 is a flowchart of a method for generating a blockchain block shown according to an exemplary embodiment of a fifth aspect of the present disclosure.

FIG. 7 is a flowchart of a method for generating a blockchain block shown according to an exemplary embodiment of a fifth aspect of the present disclosure. The method may be applied to a second node in a blockchain network. It may be understood that the second node may be any node different from the first node in the blockchain network. For example, the second node may be the cloud host 1102 shown in FIG. 1. The method includes:

in step 710, a signature block broadcasted by the first node in the blockchain network is received, wherein the signature block is generated by the first node by performing a digital signature operation on an original block, wherein the original block is generated by the first node according to a blockchain protocol.

In step 720, the signature of the signature block is verified.

In step 730, the signature block is added to the blockchain network in the case that the signature of the signature block passes the verification.

For example, the second node may verify an original block signature of the signature block by using a public key of the signature device. Wherein, the signature block is generated by the first node by attaching the original block signature to the original block. The original block signature is generated by the signature device by performing the digital signature operation on a hash value of the original block contained in an intermediate signature by using the private key of the signature device in the case that the intermediate signature passes the verification. The intermediate signature is generated by the first node by performing the digital signature operation on the hash value of the original block by using the private key of the first node.

As another example, a corresponding relationship between the node and the signature device may be stored in the blockchain. The original block signature is generated by the signature device by performing the digital signature operation on the hash value of the original block contained in an intermediate signature by using the private key of the signature device in the case that the intermediate signature is determined as a signature of the first node having the corresponding relationship. Correspondingly, the second node may verify the original block signature of the signature block by using the public key of the signature device. By adoption of the embodiment, only the original block generated by the node corresponding to the signature device may be signed by the signature device and is verified by other nodes, so that different signature devices may respectively sign the corresponding legal nodes, thereby implementing respective control of different types of block generators, and further ensuring the security of the blockchain network.

It may be understood that, in the case that the signature of the signature block passes the verification of the second node, a message of adding the signature block to the blockchain network may also be broadcasted between the nodes, so that the first node also adds the signature block to the blockchain network, and thus the blocks between the nodes are updated synchronously. In the case that the signature of the signature block does not pass the verification of the second node, a message of rejecting to add the signature block to the blockchain network may also be broadcasted between the nodes, thereby ensuring the security of the blockchain network.

Therefore, by adoption of the technical solution provided by the above embodiment of the present disclosure, the second node in the blockchain network receives the signature block broadcasted by the first node in the blockchain network, and adds the signature block to the blockchain network in the case that the signature of the signature block passes the verification, so that the generator of the block can be controlled, and only the block published by the verified block generator can be accepted by other nodes, thus providing certain guarantee for the security of the blockchain network.

Figure 8:
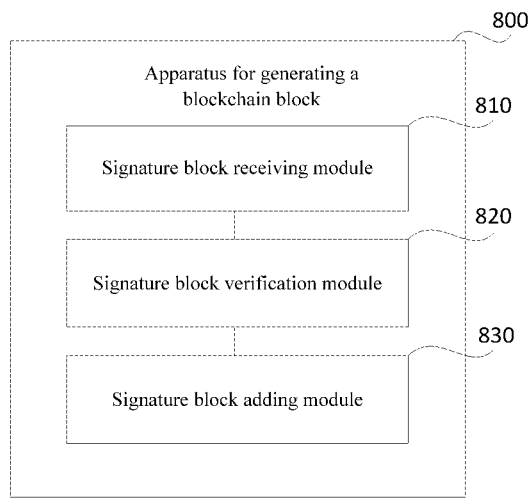
FIG. 8 is a block diagram of an apparatus for generating a blockchain block shown according to an exemplary embodiment of a sixth aspect of the present disclosure.

FIG. 8 is a block diagram of an apparatus 800 for generating a blockchain block shown according to an exemplary embodiment of a sixth aspect of the present disclosure. The apparatus may be configured in a second node in a blockchain network. It may be understood that the second node may be any node different from the first node in the blockchain network. For example, the second node may be the cloud host 1102 shown in FIG. 1. The apparatus includes a signature block receiving module 810, a signature block verification module 820 and a signature block adding module 830.

The signature block receiving module 810 may be configured to receive a signature block broadcasted by a first node in the blockchain network, wherein the signature block is generated by the first node by performing a digital signature operation on an original block, and the original block is generated by the first node according to a blockchain protocol.

The signature block verification module 820 may be configured to verify the signature of the signature block received by the signature block receiving module 810.

For example, the signature block verification module 820 may be configured to verify an original block signature of the signature block by using a public key of a signature device. The signature block is generated by the first node by attaching the original block signature to the original block. The original block signature is generated by the signature device by performing the digital signature operation on a hash value of the original block contained in an intermediate signature by using the private key of the signature device in the case that the intermediate signature passes the verification. The intermediate signature is generated by the first node by performing the digital signature operation on the hash value of the original block by using the private key of the first node.

As another example, the signature device has a corresponding relationship with the first node. The original block signature is generated by the signature device by performing the digital signature operation on the hash value of the original block contained in an intermediate signature by using the private key of the signature device in the case that the intermediate signature is determined as a signature of the first node having the corresponding relationship. Correspondingly, the signature block verification module 820 may be configured to verify the original block signature of the signature block by using the public key of the signature device.

By adoption of the embodiment, only the original block generated by the node corresponding to the signature device may be signed by the signature device and is verified by other nodes, so that different signature devices may respectively sign the legal nodes corresponding thereto, thereby implementing respective control of different types of block generators, and further ensuring the security of the blockchain network.

The signature block adding module 830 may be configured to add the signature block to the blockchain network in the case that the signature of the signature block passes the verification of the signature block verification module 820.

Therefore, by adoption of the technical solution provided by the above embodiment of the present disclosure, the second node in the blockchain network receives the signature block broadcasted by the first node in the blockchain network, and adds the signature block to the blockchain network in the case that the signature of the signature block passes the verification, so that the generator of the block can be controlled, and only the block published by the verified block generator can be accepted by other nodes, thus providing certain guarantee for the security of the blockchain network.

The seventh aspect of the embodiments of the present disclosure further provides a non-transitory computer readable storage medium, including one or more programs, and the one or more programs are used for executing the method for generating the blockchain block in any embodiment in the first aspect of the present disclosure.

The method for generating the blockchain block according to the first aspect of the embodiments of the present disclosure is applied to a first node in a blockchain network, and the method includes: generating an original block according to a blockchain protocol; performing a digital signature operation on the original block to generate a signature block; and broadcasting the signature block in the blockchain network.

Optionally, the signature block may be used for causing the second node that receives the broadcast in the blockchain network to add the signature block to the blockchain network in the case that the signature of the signature block passes the verification.

Optionally, performing a digital signature operation on the original block to generate a signature block may include: performing the digital signature operation on a hash value of the original block by using a private key of the first node to generate an original block signature, and attaching the original block signature to the original block to generate the signature block.

Optionally, performing a digital signature operation on the original block to generate a signature block may include: performing the digital signature operation on the hash value of the original block by using the private key of the first node to generate an intermediate signature; sending the intermediate signature to a signature device; receiving the original block signature sent by the signature device, wherein the original block signature is generated by the signature device by performing the digital signature operation on the hash value of the original block contained in the intermediate signature by using the private key of the signature device in the case that the intermediate signature passes the verification; and attaching the original block signature to the original block to generate the signature block.

Optionally, sending the intermediate signature to a signature device includes: sending the intermediate signature to the signature device having a corresponding relationship with the first node. The original block signature is generated by the signature device by performing the digital signature operation on the hash value of the original block contained in an intermediate signature by using the private key of the signature device in the case that the intermediate signature is determined as a signature of the first node having the corresponding relationship.

Optionally, the signature device is a mobile device.

The eighth aspect of the embodiments of the present disclosure further provides a blockchain network node. The blockchain network node includes: the non-transitory computer readable storage medium in the seventh aspect of the embodiments of the present disclosure; and one or more processors used for executing the programs in the non-transitory computer readable storage medium.

The ninth aspect of the embodiments of the present disclosure further provides a non-transitory computer readable storage medium is provided. The non-transitory computer readable storage medium includes one or more programs, and the one or more programs are used for executing the method for generating the blockchain block in any embodiment of the third aspect of the present disclosure.

The method for generating the blockchain block in the third aspect of the embodiments of the present disclosure is applied to a signature device, and the method includes: receiving an intermediate signature sent by a first node in a blockchain network, wherein the intermediate signature is generated by the first node by performing a digital signature operation on a hash value of an original block generated by the first node by using a private key of the first node; verifying the intermediate signature; performing the digital signature operation on the hash value of the original block contained in the intermediate signature by using the private key of the signature device to generate an original block signature, in the case that the intermediate signature passes the verification; and sending the original block signature to the first node, wherein the original block signature is used for causing the first node to attach the original block signature to the original block to generate a signature block.

Optionally, verifying the intermediate signature includes: verifying whether the intermediate signature is a signature of the first node having a corresponding relationship with the signature device; and indicating that the verification is passed in the case that the intermediate signature is the signature of the first node having the corresponding relationship with the signature device.

Optionally, the signature device is a mobile device.

The tenth aspect of the embodiments of the present disclosure further provides a signature device. The signature device includes: the non-transitory computer readable storage medium in the eighth aspect of the embodiments of the present disclosure; and one or more processors used for executing the programs in the non-transitory computer readable storage medium.

The eleventh aspect of the embodiments of the present disclosure further provides a non-transitory computer readable storage medium. The non-transitory computer readable storage medium includes one or more programs, and the one or more programs are used for executing the method for generating the blockchain block in any embodiment of the fifth aspect of the present disclosure.

The method for generating the blockchain block in the fifth aspect of the embodiments of the present disclosure is applied to a second node in a blockchain network, and the method includes: receiving a signature block broadcasted by a first node in the blockchain network, wherein the signature block is generated by the first node by performing a digital signature operation on an original block, and the original block is generated by the first node according to a blockchain protocol; verifying the signature of the signature block; and adding the signature block to the blockchain network in the case that the signature of the signature block passes the verification.

Optionally, verifying the signature of the signature block includes: verifying an original block signature of the signature block by using a public key of a signature device. The signature block is generated by the first node by attaching the original block signature to the original block. The original block signature is generated by the signature device by performing the digital signature operation on a hash value of the original block contained in an intermediate signature by using the private key of the signature device in the case that the intermediate signature passes the verification. The intermediate signature is generated by the first node by performing the digital signature operation on the hash value of the original block by using the private key of the first node.

Optionally, the signature device has a corresponding relationship with the first node. The original block signature is generated by the signature device by performing the digital signature operation on the hash value of the original block contained in an intermediate signature by using the private key of the signature device in the case that the intermediate signature is determined as a signature of the first node having the corresponding relationship. Verifying the signature of the signature block includes: verifying the original block signature of the signature block by using the public key of the signature device.

The twelfth aspect of the embodiments of the present disclosure further provides a blockchain network node. The blockchain network node may include: the non-transitory computer readable storage medium in the eleventh aspect of the embodiments of the present disclosure; and one or more processors used for performing the programs in the non-transitory computer readable storage medium.

The thirteenth aspect of the embodiments of the present disclosure further provides a system for generating a blockchain block. The system may include: at least one blockchain network node in the eighth aspect of the embodiments of the present disclosure, at least one signature device in the tenth aspect of the embodiments of the present disclosure, and at least one blockchain network node in the twelfth aspect of the embodiments of the present disclosure. The blockchain network node in the eighth aspect of the embodiments of the present disclosure and the blockchain network node in the twelfth aspect of the embodiments of the present disclosure belong to the same blockchain network.

The preferred embodiments of the present disclosure have been described in detail above in combination with the drawings. However, the present disclosure is not limited to the specific details in the above embodiments, various simple modifications may be made to the technical solutions of the present disclosure within the scope of the technical idea of the present disclosure an these simple variations all fall within the protection scope of the present disclosure.

In addition, it should be noted that the specific technical features described in the above specific embodiments may be combined in any suitable manner without contradiction. In order to avoid unnecessary repetition, the present disclosure does not further describe various possible combinations.

In addition, various different embodiments of the present disclosure may be randomly combined as long as not deviating from the idea of the present disclosure, and the combination should also be regarded as the content disclosed by the present disclosure.

The invention claimed is:

1. A method for generating a blockchain block, applied to a first node in a blockchain network, comprising:
   generating an original block according to a blockchain protocol;
   performing a digital signature operation on the original block to generate a signature block; and
   broadcasting the signature block in the blockchain network, wherein performing a digital signature operation on the original block to generate a signature block comprises:
      performing the digital signature operation on a hash value of the original block by using a private key of the first node to generate an intermediate signature;
      sending the intermediate signature to the signature device having a corresponding relationship with the first node;
      receiving the original block signature sent by the signature device, wherein the original block signature is generated by the signature device by performing the digital signature operation on the hash value of the original block contained in the intermediate signature by using a private key of the signature device in the case that the intermediate signature passes a verification that includes a determination that a signature of the first node has the corresponding relationship; and
      attaching the original block signature to the original block to generate the signature block.

2. A method for generating a blockchain block, applied to a signature device, comprising:
   receiving an intermediate signature sent by a first node in a blockchain network, wherein the intermediate signature is generated by the first node by performing a digital signature operation on a hash value of an original block generated by the first node by using a private key of the first node;
   verifying whether the intermediate signature is a signature of the first node having a corresponding relationship with the signature device;
   indicating that the verification is passed in the case that the intermediate signature is the signature of the first node having the corresponding relationship with the signature device;
   performing the digital signature operation on a hash value of the original block contained in the intermediate signature by using the private key of the signature device to generate an original block signature, in the case that the intermediate signature passes the verification; and
   sending the original block signature to the first node, wherein the original block signature is used for causing the first node to attach the original block signature to the original block to generate a signature block.

3. A method for generating a blockchain block, applied to a second node in a blockchain network, comprising:
   receiving a signature block broadcasted by a first node in the blockchain network, wherein the signature block is generated by the first node by performing a digital signature operation on an original block, and the original block is generated by the first node according to a blockchain protocol;
   verifying the signature of the signature block; and
   adding the signature block to the blockchain network in the case that the signature of the signature block passes the verification, wherein verifying the signature of the signature block comprises:
      verifying an original block signature in the original block by using a public key of a signature device, wherein the signature device has a corresponding relationship with the first node, the signature block is generated by the first node by attaching the original block signature to the original block generated by the first node;
      the original block signature is generated by the signature device by performing the digital signature operation on a hash value of the original block contained in the intermediate signature by using a private key of the signature device in the case that the intermediate signature is determined as the signature of the first node having the corresponding relationship; and
      the intermediate signature is generated by the first node by performing the digital signature operation on the hash value of the original block by using a private key of the first node.

4. A non-transitory computer readable storage medium, wherein the non-transitory computer readable storage medium comprises one or more programs, and the one or more programs are used for executing the method according to claim 1.

5. A blockchain network node, wherein the blockchain network node comprises:
   the non-transitory computer readable storage medium according to claim 4; and
   one or more processors used for executing the programs in the non-transitory computer readable storage medium.

6. A non-transitory computer readable storage medium, wherein the non-transitory computer readable storage medium comprises one or more programs, and the one or more programs are used for executing the method according to claim 2.

7. A signature device, wherein the signature device comprises:
   the non-transitory computer readable storage medium according to claim 6; and one or more processors used for executing the program in the non-transitory computer readable storage medium.

8. A non-transitory computer readable storage medium, wherein the non-transitory computer readable storage medium comprises: one or more programs, and the one or more programs are used for executing the method according to claim 3.

9. A blockchain network node, wherein the blockchain network node comprises:
- the non-transitory computer readable storage medium according to claim 8; and
- one or more processors used for executing the program in the non-transitory computer readable storage medium.

10. A system for generating a blockchain block, comprising:
- a first non-transitory computer readable storage medium and one or more first processors used for executing one or more programs in the first non-transitory computer readable storage medium, and the one or more programs are used for executing the method according to claim 1, where the first non-transitory computer readable storage medium and the one or more first processors form the first node;
- a second non-transitory computer readable storage medium and one or more second processors used for executing one or more programs in the second non-transitory computer readable storage medium, where the second non-transitory computer readable storage medium and the one or more second processors form the signature device, and the one or more programs in the second non-transitory computer readable storage medium are used for receiving the intermediate signature sent by the first node, verifying whether the intermediate signature is the signature of the first node having the corresponding relationship with the signature device, indicating that the verification is passed in the case that the intermediate signature is the signature of the first node having the corresponding relationship with the signature device, performing the digital signature operation on the hash value of the original block contained in the intermediate signature by using the private key of the signature device to generate the original block signature, in the case that the intermediate signature passes the verification, and sending the original block signature to the first node; and
- a third non-transitory computer readable storage medium and one or more third processors used for executing one or more programs in the third non-transitory computer readable storage medium, where the third non-transitory computer readable storage medium and the one or more third processors form the second node, and the one or more programs in the third non-transitory computer readable storage medium are used for receiving the signature block broadcasted by the first node, verifying a signature of the signature block, adding the signature block to the blockchain network in the case that the signature of the signature block passes the verification, wherein verifying the signature of the signature block comprises verifying the original block signature in the original block by using a public key of the signature device;
- wherein the first node and the second node belong to the same blockchain network.

\* \* \* \* \*